(12) United States Patent
Balan (10) Patent No.: US 7,511,264 B2
(45) Date of Patent: Mar. 31, 2009

(54) METHOD OF RESOLVING AMBIGUITY IN PHOTON COUNTING-BASED DETECTORS

(75) Inventor: Adi Balan, Haifa (IL)

(73) Assignee: CMT Medical Technologies Ltd., Yoqneam Llit (IL)

( * ) Notice: Subject to any disclaimer, the term of this patent is extended or adjusted under 35 U.S.C. 154(b) by 0 days.

(21) Appl. No.: 11/383,393

(22) Filed: May 15, 2006

(65) Prior Publication Data

US 2007/0262251 A1   Nov. 15, 2007

(51) Int. Cl.
*G01D 18/00* (2006.01)
*G12B 13/00* (2006.01)
(52) U.S. Cl. .................................. 250/252.1
(58) Field of Classification Search ............... 250/252.1
See application file for complete search history.

(56) References Cited

U.S. PATENT DOCUMENTS

| 4,091,277 A | * | 5/1978 | Doblhofer | ............... 250/214 R |
| 4,535,242 A | | 8/1985 | Dirkse et al. | |
| 5,952,662 A | | 9/1999 | McDaniel | |
| 6,310,349 B1 | * | 10/2001 | Wong et al. | ............ 250/363.09 |

* cited by examiner

*Primary Examiner*—David P. Porta
*Assistant Examiner*—Mark R Gaworecki
(74) *Attorney, Agent, or Firm*—William H. Dippert; Eckert Seamans Cherin & Mellott, LLC (57) ABSTRACT

The present invention teaches a new and unique method and apparatus of resolving the inaccuracy related to high photon counting rate in photon counting-based detectors that comprises a sensor, a discriminator and a counter. According to the method, a circuitry is provided at the output of the discriminator wherein the circuitry is adapted to measure duty cycle of a signal by which an indication of an input rate of photons to the discriminator is established.

5 Claims, 7 Drawing Sheets

METHOD OF RESOLVING AMBIGUITY IN PHOTON COUNTING-BASED DETECTORS

FIELD OF THE INVENTION

The present invention relates to methods of overdose detection. More particularly, the present invention relates to method of resolving the ambiguity related with high photon count rate in detectors based on photon counting.

BACKGROUND OF THE INVENTION

Photon counting applications have decisive impact on advances in a wide range of fields, from astronomy and metallurgy to environmental protection, health diagnostic, medical analysis and imaging.

In detectors based on photon counting, the detection of each photon is typically performed as follows:

The photon interacts with a specific scintillator that converts its energy into a short electrical signal (the conversion can be done in one stage or in multiple stages).

The electrical signal, with a specific duration in time is then amplified, shaped and compared with a specific threshold.

Every signal that has an amplitude that is higher than the threshold, switch "on" a comparator. The comparator in turn, outputs a digital signal with a duration equal to the time in which the input signal was higher than the specific threshold.

A counter that counts the pulses at the output of the comparator outputs the rate of the photons that interact with the scintillator.

This method endures some disadvantages while the major difficulty is in pile-up phenomena that occurs when two or more photons are detected as a single event. In such case, the comparator sees both photons as one. The phenomena of detection circuit being blocked for detection of a subsequent event while handling a previous event is also called dead time. Pile up or dead time phenomena are aggravated in cases in which the time interval between photon events behaves according to Poisson statistics that are the typical cases of interest.

Other electronics schemes can be used for single photon detection, however with similar shortcomings.

One option that is used in order to resolve pile-up is to work at low count rates, a solution that limits the possibilities of photon counting.

The other option is to perform pile-up corrections. Pile-up corrections are usually made in prior art methods during the pre-amplifier stage where the signal is shaped or optimized before its comparison to the threshold value. An example for a system that discloses treatment in the preamplifier zone is U.S. Pat. No. 5,952,662 "High event rate gamma camera" by McDaniel filed in 1997. The disclosed apparatus is for use with gamma camera to increase the count rate without causing "dead time" or pile up. The disclosed apparatus includes a first processor optimized for simplicity and minimum dead time but with moderate or poor spatial resolution for generally determining the impact point of a photon on a scintillator crystal and a second digital processor that uses the general position information to identify a subset of PMT intensity signals for further processing to identify the precise impact point location. In another example disclosed by Dirkse et al. in U.S. Pat. No. 4,535,242 "Method and a circuit for processing pulse of a pulse train", tails of pulses are being eliminated. To eliminate the tails of an "A" pulse, for example, a first signal is produced at the occurrence of a "T" pulse. This first signal simulates the tail of the "A" pulse and it is subtracted from the tail pile up "T" pulse. The problem in these methods is that overdose is not directly detected.

It is a long felt need to provide a reliable photon counting-based detector provided with pile-up correction means in which overdose is detected without limitation to the counter value.

The scope of the present invention is to provide a method to remove/resolve the ambiguity, enabling by this accurate pile-up correction at very high count rates.

SUMMARY OF THE INVENTION

It is an object of the present invention to provide a method for resolving ambiguity in photon-counting-based detectors that result from pile-up phenomena so as to allow detection at relatively high count rates.

It is another object of the present invention to provide an accurate detector for photon counting provided with overdose detection means so as to allow detection at relatively high count rates. The overdose detection means is a circuitry adapted to measure the duty cycle of the signal so as to allow indication on pile-up phenomenon.

It is thus provided in accordance with the present invention, a method of resolving the inaccuracy related to high photon counting rate in photon counting-based detectors that comprises a sensor, a discriminator and a counter, the method comprising providing a circuitry at the output of the discriminator wherein said circuitry is adapted to measure duty cycle of a signal by which an indication of an input rate of photons to the discriminator is established.

Furthermore, in accordance with another preferred embodiment of the present invention, said sensor is a scintillator.

Furthermore, in accordance with another preferred embodiment of the present invention, measuring duty cycle of a signal is performed by integrating said signal for a known period of time.

Furthermore, in accordance with another preferred embodiment of the present invention, measuring duty cycle of a signal is performed by averaging said signal at the discriminator output.

Furthermore, in accordance with another preferred embodiment of the present invention, further comprising calibrating said signal wherein calibrating said signal comprises:

irradiating the detector at low input event rate by a photon source of known energy placed at a predetermined distance from the apparatus;

repeatedly increasing the input event rate by reducing the distance of the photon source from the detector;

measuring read rate for different predetermined distances;

calculating new event rates based on the known distance of the source;

generating a graph of read rate versus event rate.

Furthermore, in accordance with another preferred embodiment of the present invention, further comprising:

measuring duty cycle for different predetermined distances;

generating a graph of read rate versus duty cycle.

It is also provided in accordance with yet another embodiment of the present invention, a photon counting-based detector comprising:

a sensor adapted to convert photons to electrical charge;

a discriminator loaded with a threshold value adapted to receive said electrical charges and output signals that are higher than said threshold value;

a capacitor adapted to receive said signals and to output a resulting signal indicative of a duty cycle of said signals;

whereby the duty cycle of the signals is a measure from which an overdose due to dead-time phenomenon is indicated.

Furthermore, in accordance with another preferred embodiment of the present invention, said capacitor comprises an integrator adapted to measure an integral value of said signals for a predetermined time wherein said capacitor is adapted to be charged for said predetermined time and a means for indicating when said resulted signal is higher than a predetermined value.

Additionally and in accordance with another preferred embodiment of the present invention, said capacitor comprises an averaging means adapted to measure an average value of said signals for a predetermined time wherein said capacitor is adapted to be charged for said predetermined time and a means for indicating when said resulted signal is higher than a pre-determined value.

BRIEF DESCRIPTION OF THE FIGURES.

In order to better understand the present invention and appreciate its practical applications, the following Figures are attached and referenced herein. Like components are denoted by like reference numerals.

It should be noted that the figures are given as examples and preferred embodiments only and in no way limit the scope of the present invention as defined in the appending Description and Claims.

DETAILED DESCRIPTION OF THE INEVNTION AND FIGURES

The present invention provides a unique and novel method and circuitry resolving the ambiguity caused in high photon counting rates due to pile up phenomena.

In the text herein, the terms "comparator" and "discriminator" are used for a same electronic element that is adapted to distinguish between values that are higher than a predetermined threshold and values that are lower than the threshold wherein usually and especially in the embodiments shown herein, the output of this electronic element corresponds to input signals that are higher than the threshold.

Figure 1:
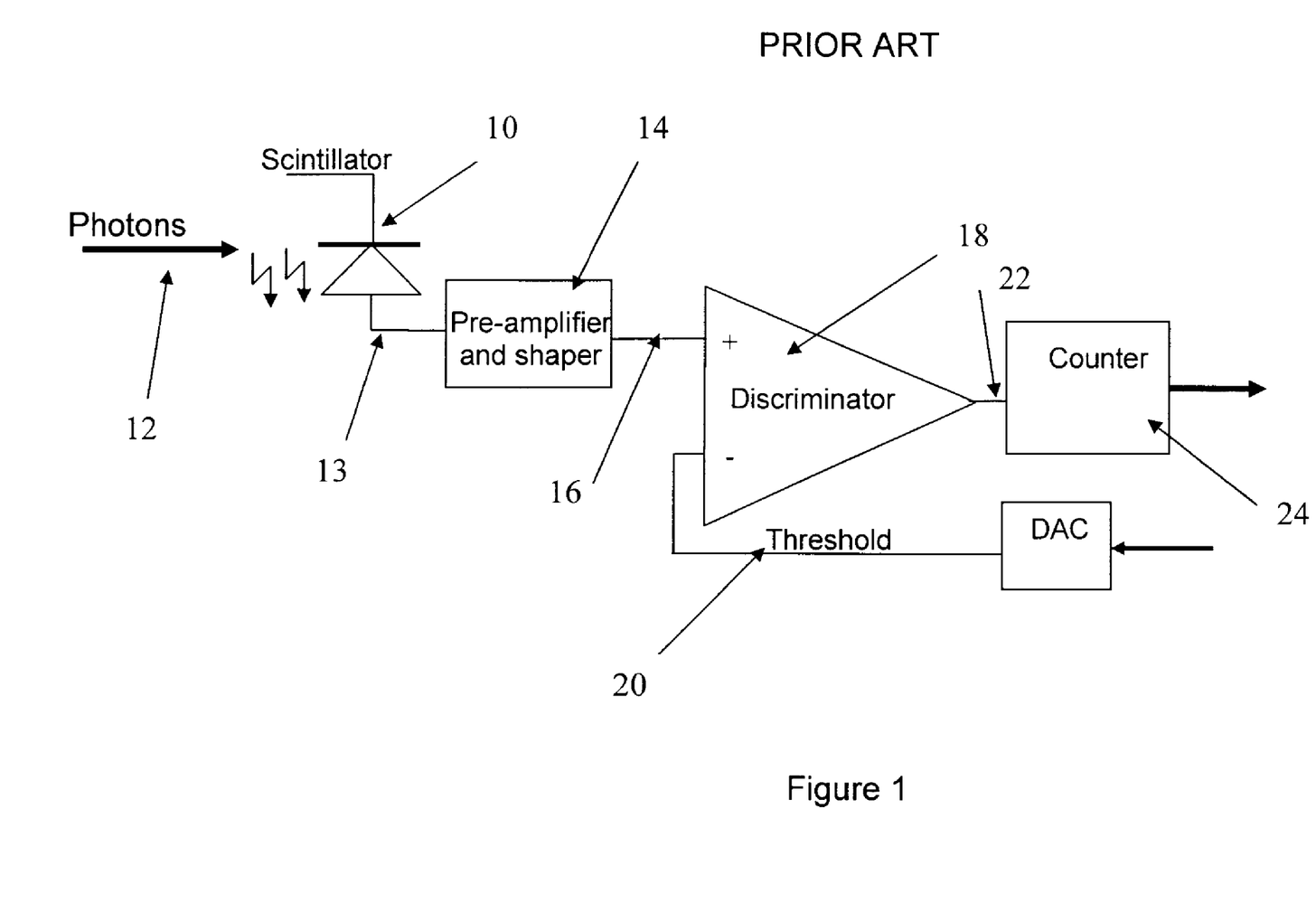
FIG. 1 illustrates generic block diagram of a photon counting detector circuit (prior art).

Reference is now made to FIG. 1 illustrating example for block diagram of a photon counting detector circuit (prior art). Prior art detectors and circuitries based on photon counting may comprise a sensor 10 (scintillator-photodiode pair shown as example) adapted to convert photons 12 to charge 13. Charge 13 is amplified and shaped by preamplifier and shaper 14 that can be an integrated unit or separated amplifier and shaper. The resulting shaped pulse 16, whose height is proportional to the energy of the absorbed photon 12 is preferably fed into a pulse height discriminator 18 that is loaded with a preset threshold level 20. Threshold 20 may be set by a Digital to Analog Converter (DAC) device or by other means. There are detectors in the art that are provided with more than one discriminator.

Discriminator 18 (comparator) outputs a pulse 22 if the input pulse level of shaped pulse 16 is above the discriminator level. Counter 24, such as a 16 bit counter, is provided so as to count the number of events detected in the discriminator.

This circuitry is sufficient when working with relatively low counting rates since each pulse 16 entering discriminator 18 is a distinct event. The difference between low counting rate and high counting rate can be better understood when the output of the discriminator is drawn on a graph versus time.

Figures 2A, 2B:
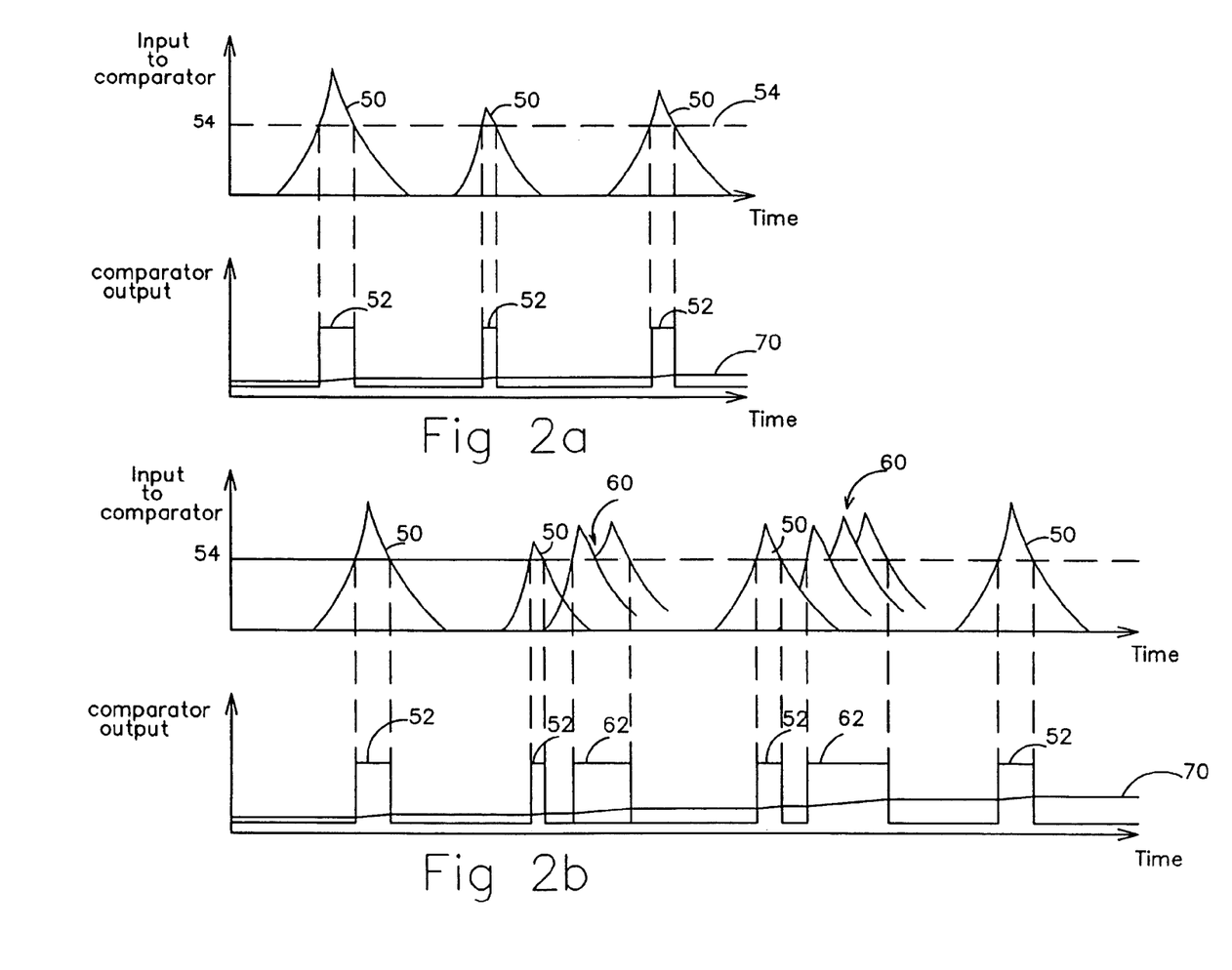
FIG. 2a illustrates input to a comparator vs. output of the comparator at relatively low counting rates.
FIG. 2b illustrates input to a comparator vs. output of the comparator at relatively high counting rates.

Reference is now made to FIGS. 2a and 2b illustrating input to a comparator vs. output of the comparator at relatively low counting rates and relatively high counting rates, respectively. In FIG. 2a, shaped pulses 50 in various heights are input into the comparator while each pulse has a shape that is formed by a shaper prior to it's entering the comparator (as shown in FIG. 1). At the output of the comparator, output signals 52 are generated corresponding to input signals 50. As mentioned herein before, the comparator or discriminator is being set with a predetermined threshold 54 so that as an output of the comparator, only input that is higher than the threshold are being output of the comparator as shown by the peaks in the lower graph of FIG. 2a. In the example of FIG. 2a, the width of output signals 52 corresponds to the width of input signals 50 above threshold 54. When the input rate is relatively low, the rate of output pulses 52 corresponds to the rate of input pulses 52 above threshold 54.

When high pulse counting rates are being fed into the comparator as shown in FIG. 2b (upper graph), it is probable that some of the neighboring input pulses 60 are to be overlapped due to the dominant tail, and interpreted as a single peak 62 as shown in the lower graph. Therefore, the rate of output pulses is smaller than the rate of input pulses and the device does not measure the true event rate. This phenomenon is the so-called "pile-up" and depends, in addition to event rate, also on the value of the threshold 54 as well as the shape of the pulses. In order to measure correctly the events rate in high count rate, pile up correction is needed.

The present invention is aimed at resolving the ambiguity related to high photon counting rates in detectors based on photon counting without having to compromise on lose of information due to increased threshold, pre-amplification of the pulse or further shaping the pulse.

Figure 3:
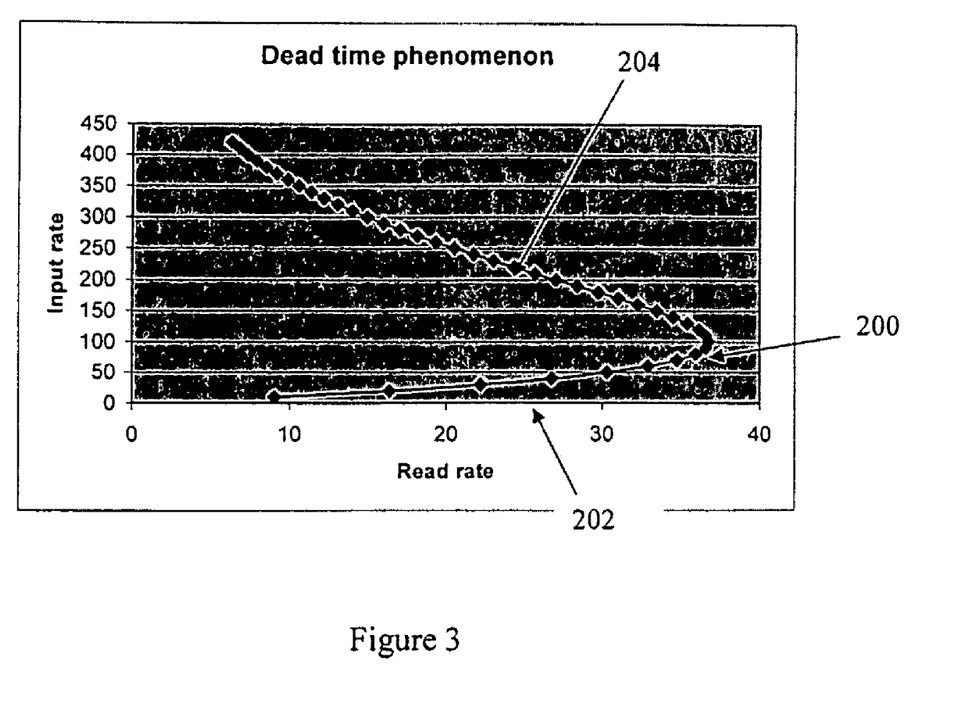
FIG. 3 schematically illustrates the input rates as a function of read rate at the output of the circuitry.

Reference is now made to FIG. 3 illustrating typical relationship between the read rate at the output of the circuitry and the input rate. By read rate is meant the rate of output signals from the detection circuitry. For low input rate, the relationship is linear; but as the input rate increases, the read rate does not follow and above certain input rate and the read rate actually drops down, forming ambiguity. It is shown that for each read rate at the output of the circuitry, two input rates are possible. The lower branch of the curve represents low rate environment and the higher branch of the curve represents high rate environment.

For high count rate (the upper branch of the curve), due to subsequent photon events that occurs in a narrow time interval (compared to the single event duration above the threshold), the comparator input analogue signal is higher than the threshold for sequences of piled up input events. Therefore, the output of the comparator is high for long periods of time as clearly shown in FIG. 2b—lower graph. Merely counting the comparator output signal rate gives ambiguous results as shown in FIG. 3.

The inventor of the present invention has realized that the average time the comparator output 52 (as shown in FIG. 2) is high is an additional indication of the input rate of photons. Therefore, measuring the average or the integral of this signal results in acquiring direct information on the count rate and can indicate, for a specific read rate by the counter, whether the rate corresponds to the low rate branch of the graph or to the high rate branch of the graph (FIG. 3). According to the present invention, the duty cycle of the signal 52 is measured at the output of the comparator so as to indicate whether the circuitry works in a low or high rate environment of FIG. 3.

The duty cycle at the output of the comparator can be measured in two generic ways:

1. By integrating the signal for a known period of time. At the end of the time period, the integral value depends of the fraction of time the signal at the comparator output was high and this depends directly on the input count rate. By the end of the time period, the integrated signal will set a flip-flop if it is higher than a pre-determined value. Likewise, according to this method, the integrator has to be zeroed at the beginning of every time period.

2. By averaging the signal at the comparator output. After a short time, the circuitry that performs the averaging will output a value that is directly proportional to the time fraction the comparator was high and to the count rate. As previously indicated, when the output is higher than a pre-determined value, a flip-flop will be set.

Figure 4A:
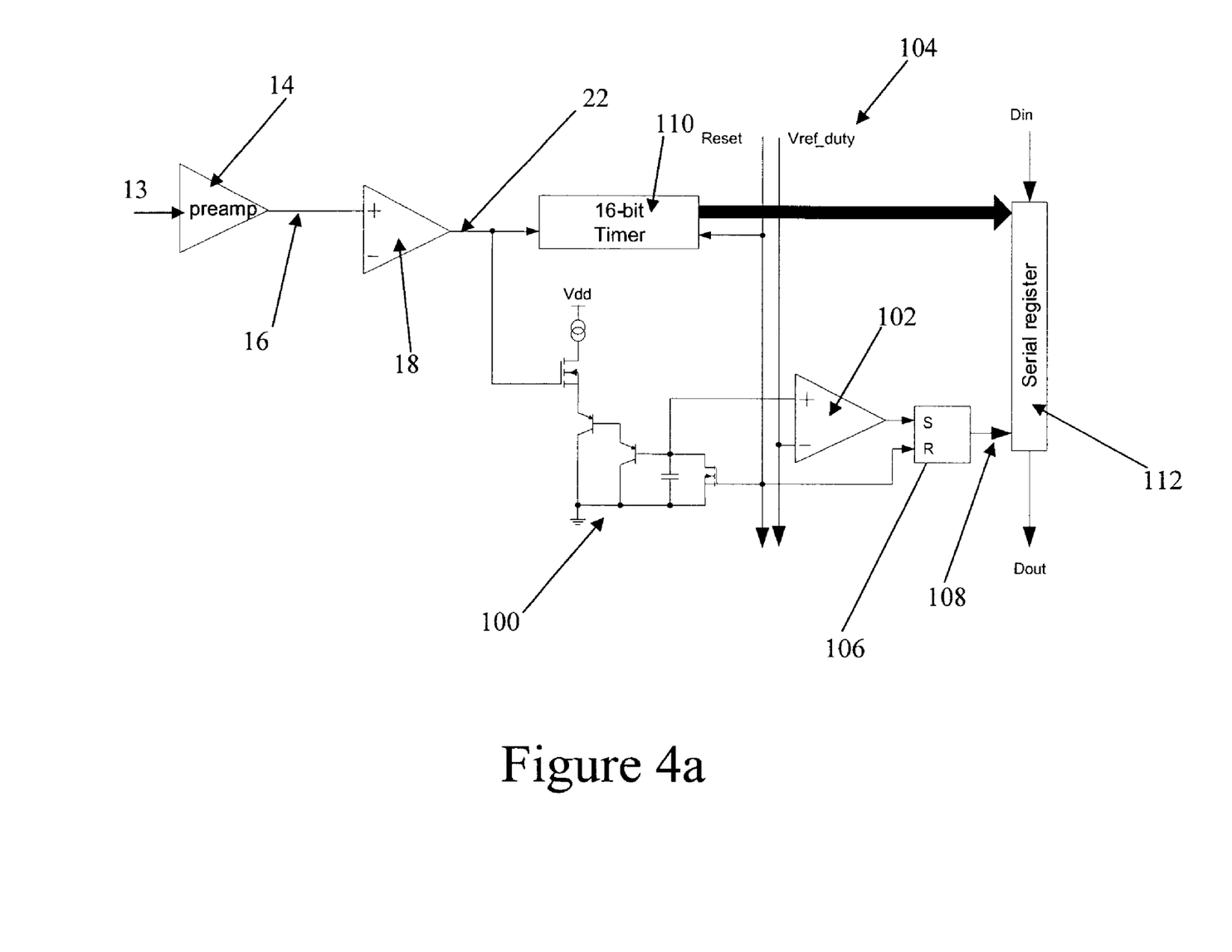
FIG. 4a illustrates a diagram of a photon counting detector circuit in accordance with a preferred embodiment of the present invention.

Reference is now made to FIG. 4a illustrating a diagram of a photon counting detector circuit in accordance with a preferred embodiment of the present invention. Charge 13 is amplified and shaped by preamplifier and shaper 14 that can be an integrated unit or separated amplifier and shaper. The resulting shaped pulse 16 is preferably fed into a pulse height discriminator 18 that is loaded with a preset threshold level. Discriminator 18 outputs a pulse 22 that is being fed into a capacitor for duty cycle measurement 100. The capacitor is charged at a voltage that depends on the count rate at the capacitor's input and also on the integration time. If the integration time is held unchanged, then the dependence is only on count rates. The capacitor charges only when comparator 18 outputs a pulse 22 that is in a high state. The signal exiting capacitor 100 enters a second discriminator 102 that outputs a high signal only if the voltage on capacitor 100 is higher than the pre-defined value Vref_duty 104. Vref_duty value 104 is established during calibration procedures and corresponds to the extreme point indicating maximum read rate 200 on the graph shown in FIG. 3. When discriminator 100 goes high it sets high an SR flip-flop 106 that follows. The value 108 of SR flip-flop 106 is read and timed using timer 110 is registered using counter 112 that indicates whether the read values correspond to one branch 202 of the graph of input rate versus read rate shown in FIG. 3 or to the second branch 204.

At the end of every cycle, capacitor 100 is discharged and SR Flip-flop 106 is reset.

Figure 4B:
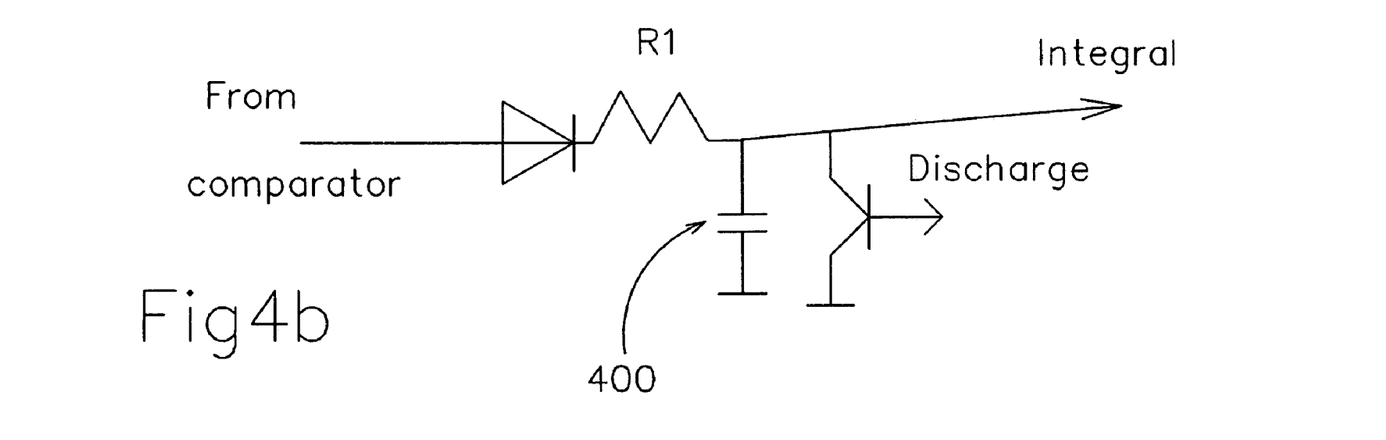
FIG. 4b illustrates a portion of an electronic circuit for ambiguity detection in accordance with a preferred embodiment of the present invention.
Figure 4C:
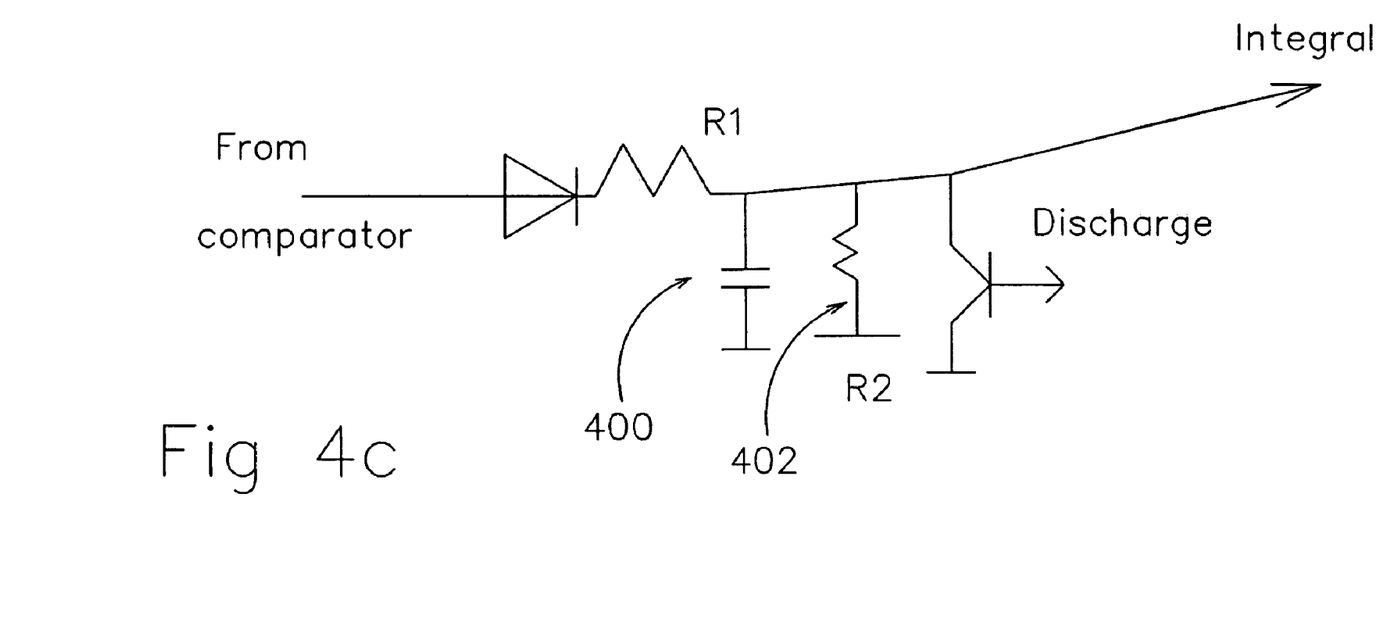
FIG. 4c illustrates a portion of an electronic circuit for ambiguity detection in accordance with another preferred embodiment of the present invention.

Reference is now made to FIGS. 4b and 4c illustrating a portion of electronic circuits for ambiguity detection in accordance with preferred embodiments of the present invention. Both circuits are prototypes of capacitor 100 shown in FIG. 4a that is adapted to be charged according to an integral or an average, respectively, of the signal received from the comparator.

The major differences between the two implementation are:

In the implementation shown in FIG. 4b, which is the integrator implementation, the signal coming from the comparator charges capacitor 400 when the signal is high. When the signal is low, the capacitor keeps the charge. At the end of an operation cycle, the charge on capacitor 400 corresponds to the integral of the signal at the discriminator output. Since the charge on the capacitor increasing in time, the total charge at the end of the cycle depends on the count rate and on the integration time.

In the implementation shown in FIG. 4c, there is a resistor 402 in parallel with the capacitor 400. In this case, discharge of capacitor 400 on this resistor occurs during the whole time cycle. After an interval of time from the beginning of the cycle, the charge on capacitor 400 is proportional to the average signal at the comparator output. The main advantage of this implementation is that the average does not depend on the cycle's time. The main disadvantage is that its implementation is more difficult since it needs an additional high value resistor and the ratio between two resistors has to be quite accurate.

Figure 5:
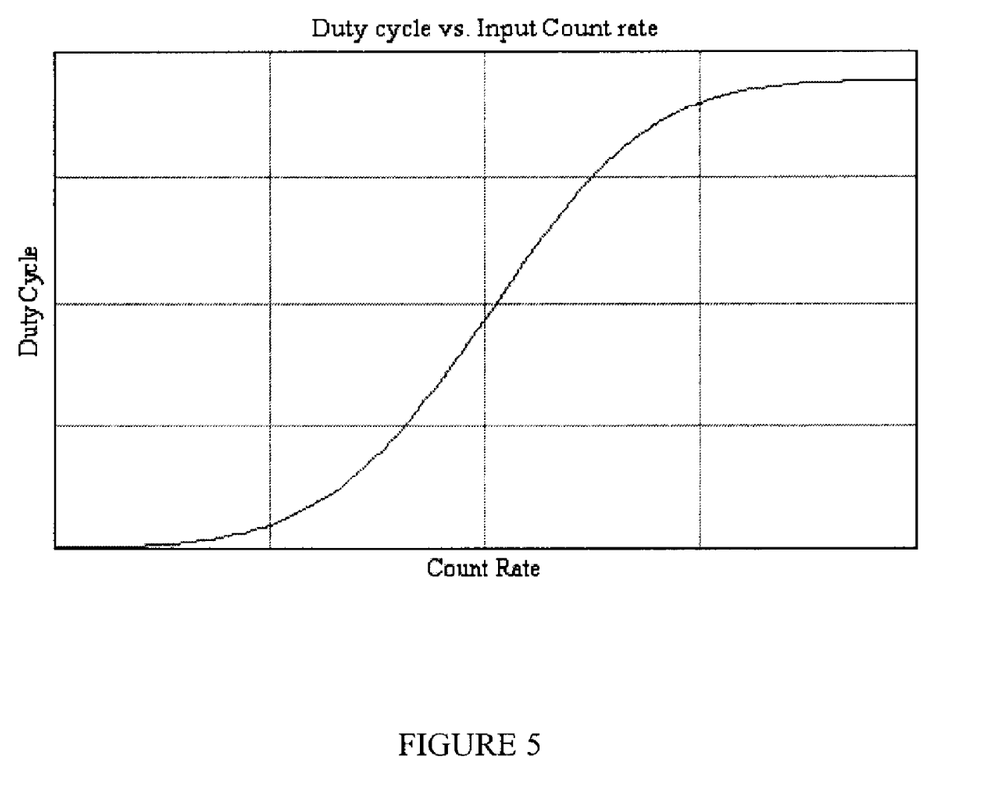
FIG. 5 schematically illustrates an exemplary calibration graph of duty cycle versus input count rate.

Reference is now made to FIG. 5 schematically illustrating an exemplary calibration graph of duty cycle versus input count rate. This calibration graph is used to calibrate the apparatus of the present invention as will be explained herein after.

Figure 6:
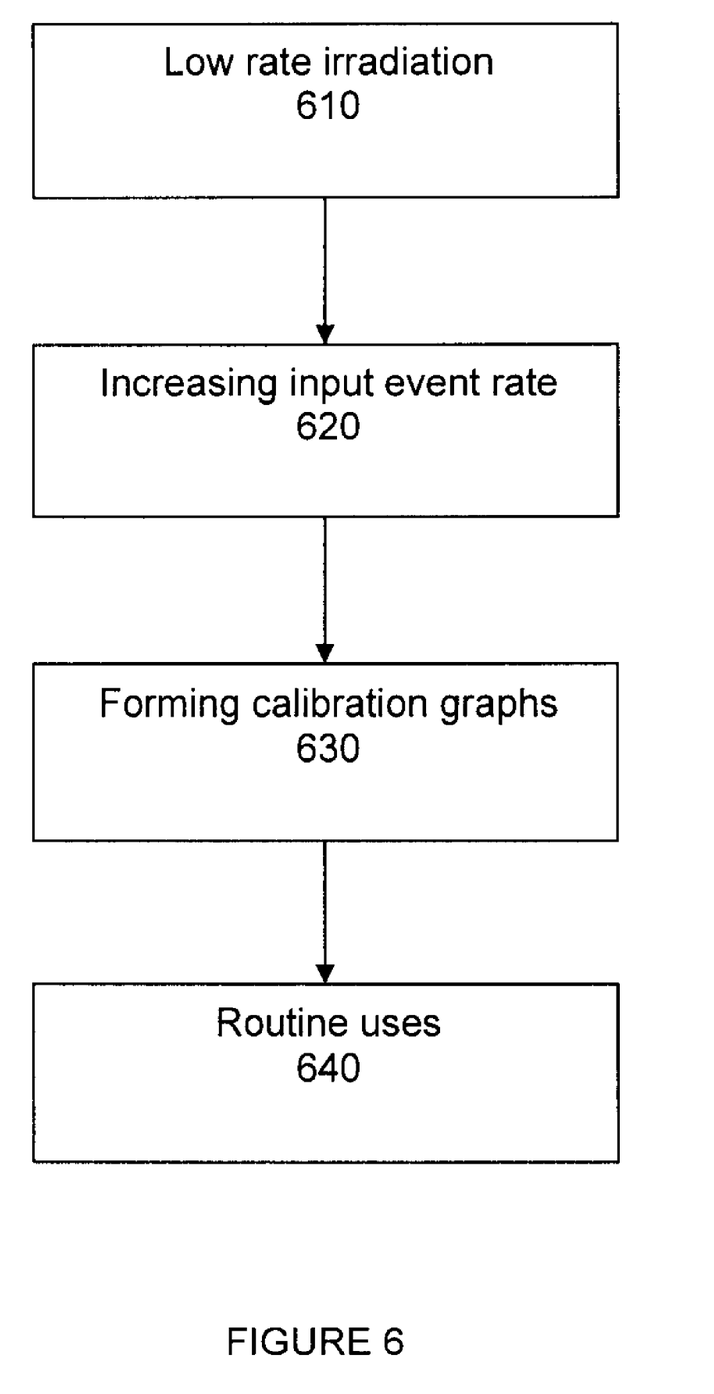
FIG. 6 illustrates a calibration process in accordance with a preferred embodiment of the present invention.

Reference is now made to FIG. 6 illustrating a calibration process in accordance with a preferred embodiment of the present invention. Single photon detection apparatus is irradiated at low input event rate by a photon source of known energy spectrum such as a radioactive source placed at a predetermined distance from the apparatus (610). Preferably, the energy spectrum of the photons from the source corresponds to the energy spectrum to be used in the intended use of the apparatus. At the low event rate, the read rate corresponds to the event rate and the intensity of the source is determined. Next, the input event rate is repeatedly increased by increasing the intensity or by reducing the distance of the photon source from the apparatus (620). New event rates are calculated based on the known distance of the source and new read rate are measured. The output signal duty cycle is measured as well at each distance. The results of the measurements are used to generate two calibration graphs: a graph of read rate versus event rate as shown in FIG. 3 and duty cycle as shown in FIG. 5 (630). This pair of graphs forms calibration data for the apparatus. Finally, in routine use of the apparatus (640), the apparatus is irradiated by flux of photons and the event rate is determined as explained herein before from the calibration graphs.

In some preferred embodiments of the present invention, the duty cycle signal is used as a measure of event rate and is corrected according with the measured graph as described hereinabove.

In other preferred embodiments of the present invention, both graphs are being used. The event rate is determined from the read rate being corrected by the calibration graph, while the value of the duty cycle signal is used to determine which branch of the read rate graph should be used.

It should be clear that the description of the embodiments and attached Figures set forth in this specification serves only for a better understanding of the invention, without limiting its scope as covered by the following claims.

It should also be clear that a person skilled in the art, after reading the present specification can make adjustments or amendments to the attached Figures and above described embodiments that would still be covered by the following claims.

The invention claimed is:

1. A method of resolving the inaccuracy related to high photon counting rate in a photon counting-based detector that comprises a sensor, a discriminatory and a counter, the method comprising providing a circuitry at the output of the discriminator wherein said circuitry is capable of measuring duty cycle of a signal using a comparator by which an indication of an input rate of photons to the discriminator is established, wherein measuring duty cycle of a signal is performed by averaging said signal at the discriminator output.

2. The method as claimed in claim 1, wherein said sensor is a scintillator.

3. The method as claimed in claim 1, further comprising calibrating said signal wherein calibrating said signal comprises:
    irradiating the detector at low input event rate by a photon source of known energy placed at a predetermined distance from the apparatus;
    repeatedly increasing the input event rate by reducing the distance of the photon source from the detector;
    measuring read rate for different predetermined distances;
    calculating new event rates based on the known distance of the source; and
    generating a graph of read rate versus event rate.

4. The method as claimed in claim 3, further comprising:
    measuring duty cycle for different predetermined distances and
    generating a graph of read rate versus duty cycle.

5. A photon counting-based detector comprising:
    a sensor capable of converting photons to electrical charge;
    a discriminator loaded with a threshold value capable of receiving said electrical charges and outputting a digital "High" signal when said electrical charges are higher than said threshold value; and
    a capacitor capable of receiving said signals and outputting a resulting signal solely indicative of a duty cycle of said signals,
whereby the duty cycle of the signals is a measure from which an overdose due to dead-time phenomenon is indicated and wherein said capacitor comprises an averaging means capable of measuring an average value of said signals for a predetermined time wherein said capacitor is adapted to be charged for said predetermined time and a means for indicating when said resulted signal is higher than a pre-determined value.

* * * * *